(12) United States Patent
Takeshita

(10) Patent No.: US 9,590,725 B2
(45) Date of Patent: Mar. 7, 2017

(54) MULTI-FAILURE RESOLUTION OPTICAL NODE, OPTICAL COMMUNICATION SYSTEM USING SAME, AND WAVELENGTH PATH SWITCHING METHOD

(71) Applicant: NEC Corporation, Minato-ku, Tokyo (JP)

(72) Inventor: Hitoshi Takeshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 104 days.

(21) Appl. No.: 14/418,160

(22) PCT Filed: Jul. 30, 2013

(86) PCT No.: PCT/JP2013/004597
§ 371 (c)(1),
(2) Date: Jan. 29, 2015

(87) PCT Pub. No.: WO2014/020896
PCT Pub. Date: Feb. 6, 2014

(65) Prior Publication Data
US 2015/0333821 A1  Nov. 19, 2015

(30) Foreign Application Priority Data
Aug. 3, 2012  (JP) ................. 2012-172516

(51) Int. Cl.
*G02F 1/00* (2006.01)
*H04B 10/038* (2013.01)
(Continued)

(52) U.S. Cl.
CPC ....... *H04B 10/038* (2013.01); *G06F 11/2025* (2013.01); *H04J 14/0295* (2013.01); *H04L 69/40* (2013.01)

(58) Field of Classification Search
CPC ..... H04L 27/2665; H04L 12/18; H04L 25/08; H04L 27/2657; H04N 21/41422;
(Continued)

(56) References Cited

U.S. PATENT DOCUMENTS 6,721,502 B1 * 4/2004 Al-Salameh ........ H04J 14/0227
398/12
7,072,584 B1 * 7/2006 Lichtman ............ H04J 14/0283
398/3
(Continued)

FOREIGN PATENT DOCUMENTS

JP    H07-95132 A      4/1995
JP    2000-209244 A    7/2000
(Continued)

OTHER PUBLICATIONS

International Search Report for PCT Application No. PCT/JP2013/004597, mailed on Sep 24, 2013.

*Primary Examiner* — Juan A Torres

(57) ABSTRACT

A multi-failure resolution optical node includes an operating system wavelength path and two or more standby system wavelength paths which are assigned to the operating system wavelength path and have been assigned a ranking. It further includes a node control unit that can separately operate the operating system wavelength path and the standby system wavelength paths in a normal power consumption mode or a reduced power consumption mode. Thus, it is possible to provide an optical node with which power consumption is reduced and with which switching to a standby system wavelength path can be performed quickly in response to a failure in the operating system wavelength path.

12 Claims, 5 Drawing Sheets

(51) Int. Cl.
*G06F 11/20* (2006.01)
*H04L 29/14* (2006.01)
*H04J 14/02* (2006.01)

(58) Field of Classification Search
CPC ............. H04N 21/42607; H04N 5/455; H04N 5/4401; H04W 76/002
USPC .......................................................... 398/2
See application file for complete search history.

(56) References Cited

U.S. PATENT DOCUMENTS

| | | | |
|---|---|---|---|
| 7,764,881 B2* | 7/2010 | Aoki .................. | H04Q 11/0005 398/19 |
| 2006/0210266 A1* | 9/2006 | Aoki .................. | H04Q 11/0005 398/19 |
| 2010/0092173 A1* | 4/2010 | Matsuo ................. | H04J 3/1611 398/50 |

FOREIGN PATENT DOCUMENTS

| | | |
|---|---|---|
| JP | 2008-167242 A | 7/2008 |
| JP | 2010-098434 A | 4/2010 |
| WO | 2004/075494 A1 | 9/2004 |

\* cited by examiner

МULTI-FAILURE RESOLUTION OPTICAL NODE, OPTICAL COMMUNICATION SYSTEM USING SAME, AND WAVELENGTH PATH SWITCHING METHOD

CROSS REFERENCE TO RELATED APPLICATIONS

This application is a National Stage Entry of PCT/JP2013/004597 filed on Jul. 30, 2013, which claims priority from Japanese Patent Application 2012-172516 filed on Aug. 3, 2012, the contents of all of which are incorporated herein by reference, in their entirety.

TECHNICAL FIELD

The present invention is related to an optical node that includes a multi-failure recovery function, and in particular, to an optical node that includes a multi-failure recovery function that reduces the power consumption, an optical communication system using the optical node, and a wavelength path switching method.

BACKGROUND ART

As disclosed in Patent literature 1, in an optical node of an optical communication network, in order to improve the reliability of a wavelength path that is a communication path, a dedicated standby system wavelength path is generally assigned to an operating system wavelength path. The same traffic as the operating system wavelength path is caused to pass through the standby system wavelength path, so that switching can be performed from the operating system wavelength path to the standby system wavelength path immediately at the wavelength path reception end when a failure occurs in the operating system wavelength path. As a result, the immediate failure recovery can be achieved to secure the reliability of the wavelength path.

Recently, the communication throughput for each wavelength path has been increased up to at an annual rate of 40%, and a demand for improvement of the reliability of a wavelength path has been increasing. As disclosed in Patent literature 2, in order to respond to the demand, the improvement of the reliability is achieved by assigning a plurality of standby system wavelength paths to the operating system wavelength path.

CITATION LIST

Patent Literature

[Patent literature 1] Japanese Laid-open Patent Publication No. 7-95132
[Patent literature 2] Japanese Laid-open Patent Publication No. 2008-167242

SUMMARY OF INVENTION

Technical Problem

Recently, in an effort for an increase in the capacity of an optical communication network, which responds to an increase in an information communication amount, a reduction in the power consumption is a significant challenge. On the contrary, in the technology that achieves the improvement of the reliability of the above-described optical node, there are the following problems. That is, as disclosed in Patent literature 2, the reliability is improved as the number of standby system wavelength paths becomes large, but the number of required optical transceivers is also increased, so that an increase in the power consumption is caused.

In Patent literature 1, as a method by which the power consumption by the standby system wavelength path is reduced, a method has been disclosed by which the power consumption is reduced by blocking provision of electric power to the standby system wavelength path when the operating system wavelength path is being executed normally. However, in such a method, a time is taken to provide electric power to the standby system wavelength path and start up the standby system wavelength path when a failure occurs in the operating system wavelength path, thereby blocking the immediate switching.

The present invention has been made in view of the above-described problems, and an object of the present invention is to provide an optical node that includes a multi-failure recovery function that allows immediate switching to be performed from an operating system wavelength path to a standby system wavelength path in response to an occurrence of a failure in the operating system wavelength path in order to secure the reliability of the wavelength paths for multi-failure while the power consumption is reduced, an optical communication system using the optical node, and a wavelength path switching method.

Solution to Problem

There is provided a multi-failure resolution optical node that includes an operating system wavelength path, two or more ranked standby system wavelength paths that are assigned to the operating system wavelength path, and node control means that separately operates the operating system wavelength path and the standby system wavelength path in a normal power consumption mode or reduced power consumption mode.

There is provided an optical communication system includes the multi-failure resolution optical node that is provided on a transmission side, the multi-failure resolution optical node that is provided on a reception side, and network control means that causes information to be shared between the node control means of the multi-failure resolution optical node on the transmission side and the node control means of the multi-failure resolution optical node on the reception side.

There is provide a wavelength path switching method in which an operating system wavelength path is operated in a normal power consumption mode, and a standby system wavelength path having first order is operated in the normal power consumption mode, and a standby system wavelength path having second order or less is operated in a reduced power consumption mode, from among two or more ranked standby system wavelength paths that are assigned to the operating system wavelength path, and the standby system wavelength path is switched to the operating system wavelength path, and that includes a first checking step of checking presence or absence of a failure in the operating system wavelength path, a second checking step of checking presence or absence of a failure in the standby system wavelength path having the first order when the presence of the failure in the operating system wavelength path is determined in the first checking step, a first switching step of switching the standby system wavelength path having the first order to the operating system wavelength path when the absence of the failure in the standby system wavelength path having the first order is determined in the second checking step, a third checking step of checking presence or absence of a failure in the standby system wavelength path having the second order or less by switching the mode of the standby system wavelength path having the second order or less to the normal power consumption mode in order from a top of the ranking when the presence of the failure is determined in the standby system wavelength path having the first order in the second checking step, and a second switching step of switching the standby system wavelength path having the second order or less the absence of the failure of which is determined first in the third checking step, to the operating system wavelength path.

Advantageous Effects of Invention

In the present invention, there is provided a multi-failure resolution optical node in which switching to a standby system wavelength path is allowed to be performed quickly in response to an occurrence of a failure in an operating system wavelength path in order to secure the reliability of the wavelength paths for multi-failure while the power consumption is reduced, an optical communication system using the multi-failure resolution optical node, and a wavelength path switching method.

DESCRIPTION OF EMBODIMENTS

Preferred embodiments of the present invention are described below in detail with reference to drawings. Here, the limit that is technically preferable to carry out the present invention is performed on the embodiments that are described below, but it is not intended to limit the scope of the invention to the following description.

First Embodiment

Description of Configuration

A first embodiment of the present invention is described below in detail with reference to FIG. 1. In an optical communication system 1000 illustrated in FIG. 1, an optical signal is input to an optical node 1020 through an optical fiber 1300, and the input signal is guided to an optical switch 1010. The optical switch 1010 is controlled by a node controller 1011. The optical signal is guided to the optical transceivers 1001 to 1004 after desired switching has been performed by the optical switch 1010.

The electric power consumption mode of the optical transceivers 1001 to 1004 is controlled by the node controller 1011. As the controlled electric power consumption mode, there are two modes of a normal power consumption mode in which transmission and reception of an optical signal can be performed, and a reduced power consumption mode in which transmission and reception of an optical signal are not allowed to be performed, but the power consumption is reduced. In order to achieve the transmission and reception of an optical signal by the optical transceiver in the reduced power consumption mode, the reduced power consumption mode is changed to the normal power consumption mode in response to an instruction from the node controller.

The optical transceivers 1001 to 1004 are respectively connected to optical fibers 1201 to 1204, and the signal is received at optical transceivers 1101 to 1104 that are provided in an optical node 1120. The electric power consumption mode of the optical transceivers 1101 to 1104 is also controlled by a node controller 1111 similar to the above-described optical node 1020. The outputs of the optical transceivers 1101 to 1104 are connected to an optical switch 1110, and a desired output of the optical transceivers 1101 to 1104 is selected and can be transmitted to an optical fiber 1301 through the control of the optical switch 1110 by the node controller 1111.

The node controller 1111 also includes a function that monitors optical signal reception qualities of the optical transceivers 1101 to 1104, and for example, can perform optical switch control so as to select an optical transceiver output having the best quality, and transmit the optical transceiver output to the optical fiber 1301. In addition, the node controllers 1011 and 1111 can share information through a network controller 1400, and mutual cooperation control of the optical switches and the optical transceivers can be performed between the optical nodes 1020 and 1120.

Figure 1:
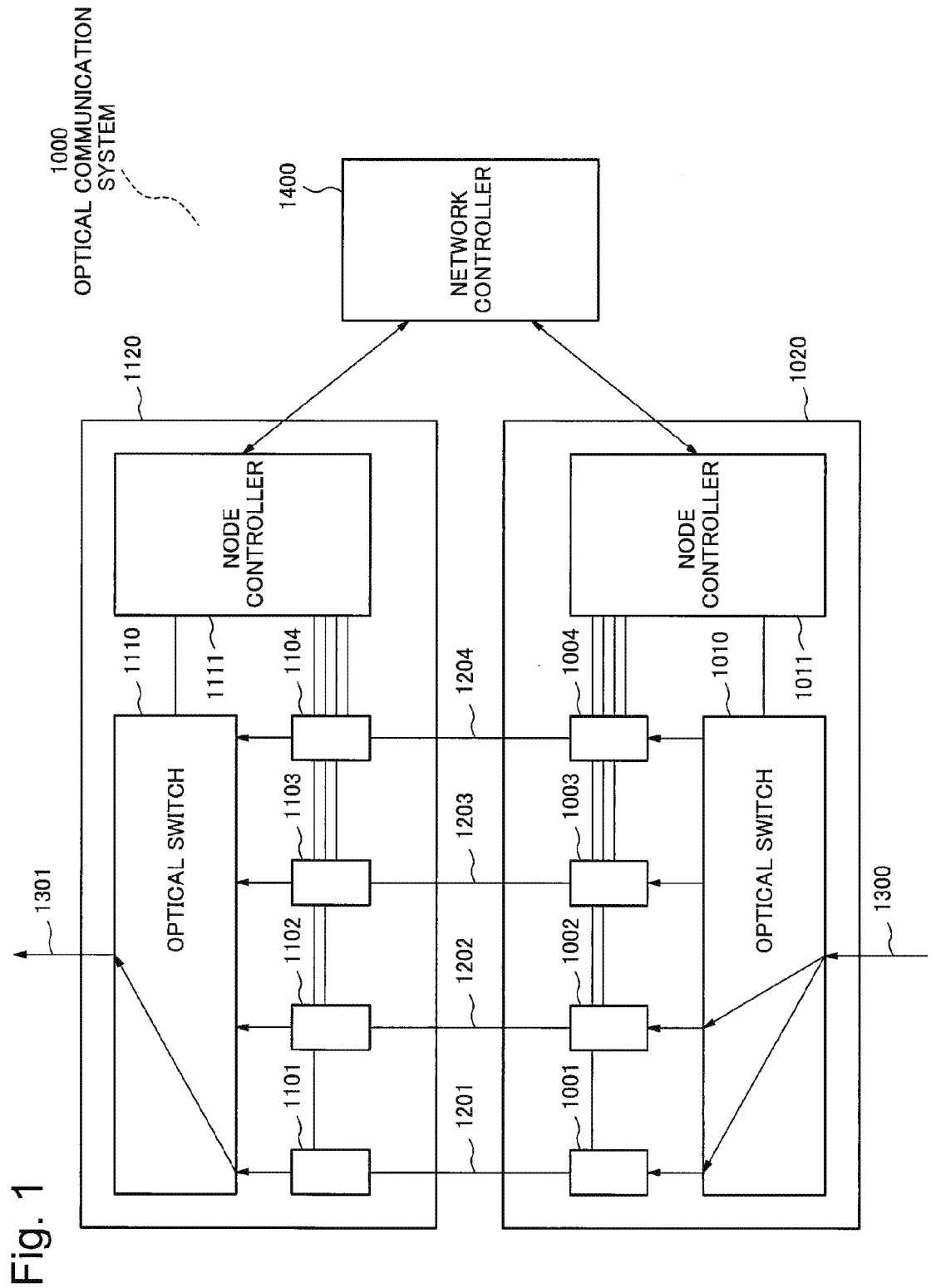
FIG. 1 is a diagram illustrating a configuration of a multi-failure resolution optical node according to a first embodiment of the present invention.

In the optical communication system 1000 in FIG. 1, a path using the optical fiber 1201 is an operating system wavelength path. That is, the operating system wavelength path is constituted by the optical switch 1010, the optical transceiver 1001, the optical fiber 1201, the optical transceiver 1101, and the optical switch 1110. In addition, standby system wavelength paths are ranked beforehand so that a path using the optical fiber 1202 serves as a first standby system wavelength path, and a path using the optical fiber 1203 serves as a second standby system wavelength path, and a path using the optical fiber 1204 serves as a third standby system wavelength path. The standby system wavelength paths are also respectively constituted by the optical switch 1010, the optical transceivers 1002 to 1004, the optical fibers 1202 to 1204, the optical transceivers 1102 to 1104, and the optical switch 1110 similar to the operating system wavelength path.

(Description of Operation)

The operation according to the first embodiment of the present invention, which is configured as described above, is described below in detail with reference to FIG. 1.

In the optical communication system 1000 in FIG. 1, the optical nodes 1020 and 1120 are connected to each other through the optical fibers 1201 to 1204, and information is shared between the node controllers 1011 and 1111 through the network controller 1400. That is, through the network controller 1400, it is defined that the operating system wavelength path is the path using the optical fiber 1201, and is constituted by the optical switch 1010, the optical transceiver 1001, the optical fiber 1201, the optical transceiver 1101, and the optical switch 1110, and the standby system wavelength paths are ranked beforehand so that the path using the optical fiber 1202 serves as the first standby system wavelength path, and the path using the optical fiber 1203 serves as the second standby system wavelength path, and the path using the optical fiber 1204 serves as the third standby system wavelength path, and are respectively constituted by the optical switch 1010, the optical transceivers 1002 to 1004, the optical fibers 1202 to 1204, the optical transceivers 1102 to 1104, and the optical switch 1110, and information is shared between the node controllers 1011 and 1111 of the optical nodes 1020 and 1120.

The optical signal that has been input to the optical node 1020 through the optical fiber 1300 is branched and selected in the optical switch 1010, in response to an instruction from the node controller 1011, and the branched and selected optical signals that are output to the optical transceivers 1001 to 1004. Thus, the optical signals are input to the optical transceivers 1001 to 1004 are identical. It is set that the optical signals that have been output from the optical transceivers 1001 to 1004 are transmitted through the operating system wavelength path and the first to third ranked standby system wavelength paths, and are received at the optical transceivers 1101 to 1104 of the optical node 1120. The optical signals from the optical transceivers 1101 to 1104 are transmitted to the optical switch 1110, and the output from the optical transceiver 1101 that is connected to the operating system wavelength path is merely selected in response to an instruction from the node controller 1111 and transmitted through the optical fiber 1301 when a failure does not occur in the operating system wavelength path.

Here, it is set that the optical transceivers 1001 and 1002 are operated in the normal power consumption mode, in response to an instruction from the node controller 1011, and the optical transceivers 1003 and 1004 are operated in the reduced power consumption mode. Therefore, the only optical transceivers 1001 and 1002 are in the state in which outputs of optical signals can be performed, and the optical signals are have been output only to the operating system wavelength path and the first standby system wavelength path.

The electric power consumption mode settings of the optical transceivers 1001 to 1004 are shared between the node controllers 1011 and 1111 through the network controller 1400. The only optical transceivers 1101 and 1102 can receive optical signals in the optical node 1120, so that the node controller 1111 instructs the optical transceivers 1101 and 1102 to be operated in the normal power consumption mode, and instructs the optical transceivers 1103 and 1104 to be operated in the reduced power consumption mode. The node controller 1111 monitors the optical signal reception qualities in the optical transceiver 1101 and 1102, and the output of the only optical transceiver 1101 that is connected to the operating system wavelength path is selected and guided to the optical fiber 1301 by controlling the optical switch 1110 when a failure does not occur in the operating system wavelength path.

When a failure occurs in the operating system wavelength path, the node controller 1111 detects that the optical signal reception quality in the optical transceiver 1101 is reduced. The node controller 1111 checks the optical signal reception quality in the optical transceiver 1102 that is connected to the first standby system wavelength path to which the optical signal that is the same as the operating system wavelength path has been transmitted. When it is determined that a failure does not occur in the first standby system wavelength path, failure recovery is performed by controlling the optical switch 1110 and switching the connection source of the optical fiber 1301 from the optical transceiver 1101 to the optical transceiver 1102.

However, when the node controller 1111 detects that a failure also occurs in the first standby system wavelength path, the optical transceiver 1103 is caused to be in a state in which the optical transceiver 1103 can receive an optical signal by switching the mode of the optical transceiver 1103 from the reduced power consumption mode to the normal power consumption mode, and the occurrences of failures of the operating system wavelength path and the first standby system wavelength path at the same time are notified to the node controller 1011 in the optical node 1020 through the network controller 1400. The node controller 1011 that has received such notification switches the mode of the optical transceiver 1003 from the reduced power consumption mode to the normal power consumption mode, and controls the optical switch 1010 to perform branching on an input signal from the optical fiber 1300, and output the branched signals to the optical transceiver 1003 as well. After switching of the mode of the optical transceiver 1003 to be normal power consumption mode has been completed, the input signal from the optical fiber 1300 is caused to be output to the second standby system wavelength path.

In the optical node 1120, the optical transceiver 1103 that is connected to the second standby system wavelength path becomes in the state of being allowed to receive an optical signal in response to an instruction from the node controller 1111. When the node controller 1111 checks the optical signal reception quality of the optical transceiver 1103, and determines that a failure does not occur, the double failure in the operating system wavelength path and the first standby system wavelength path can be recovered by controlling the optical switch 1110 and switching the connection source of the optical fiber 1301 to the optical transceiver 1103.

Here, in a case in which the node controller 1111 determines that a failure occurs in the optical transceiver 1103 when the node controller 1111 checks the optical signal quality of the optical transceiver 1103, similarly, the triple failure of the operating system wavelength path, the first standby system wavelength path, and the second standby system wavelength path can be recovered by using the optical transceivers 1104 and 1004, and the third standby system wavelength path. Even when the failure multiplicity is increased, it is only sufficient to increase the number of optical transceivers, and the number of standby system wavelength paths, and the failure recovery scheme is the same as the above-described case.

In addition, when a failure does not occurs in the first standby system wavelength path, and switching to the operating system wavelength path is performed, the mode of the second standby system wavelength path may be switched to the normal power consumption mode. As described above, in a case in which the higher ranked standby system wavelength path from among the ranked standby system wavelength paths is switched to the operating system wavelength path, when a failure occurs in the higher ranked standby system wavelength path that has been newly switched to the operating system wavelength path, and the next ranked standby system wavelength path is switched to the operating system wavelength path, the failure recovery can be performed quickly by switching the mode of the next ranked standby system wavelength path to the normal power consumption mode.

(Description of Effect)

In the above-described configuration according to the first embodiment of the present invention, the optical transceiver for the first standby system wavelength path is operated in the normal power consumption mode for the optical transceiver for the operating system wavelength path. Thus, the failure recovery time and the power consumption of the operating system wavelength path for a single failure are not reduced. In order to prepare for double failure, the optical transceiver for the second standby system wavelength path is provided additionally and operated. At that time, conventionally, similar to the optical transceiver for the first standby system wavelength path, the optical transceiver for the second standby system wavelength path is operated in the normal power consumption mode, and the required electric power triples (operating system+standby 1+standby 2) compared with the case of required electric power for the only operating system wavelength path.

When a probability that a failure occurs is set as "P(<1)", a probability that a failure occurs in the first standby system wavelength path in addition to the operating system wavelength path is represented as "P×P(<P<1)", so that it is very likely to consume unnecessary power greatly when the optical transceiver for the second standby system wavelength path is operated in the normal power consumption mode. Therefore, in the embodiment, the power consumption in the entire optical node is reduced by operating the optical transceiver for the second or subsequent standby system wavelength path in the minimum power operation mode.

As described above, in the embodiment, the power consumption of the entire optical node can be reduced while the reliability of the optical communication network is secured. This is why the electric power that is consumed unnecessarily in the standby system wavelength path is reduced selectively. In addition, the embodiment is scalable.

This is why the number of standby system wavelength paths can be increased or decreased flexibly depending on an increase or decrease in the number of operating system wavelength paths and the failure recovery multiplicity.

EXAMPLES

Figure 5:
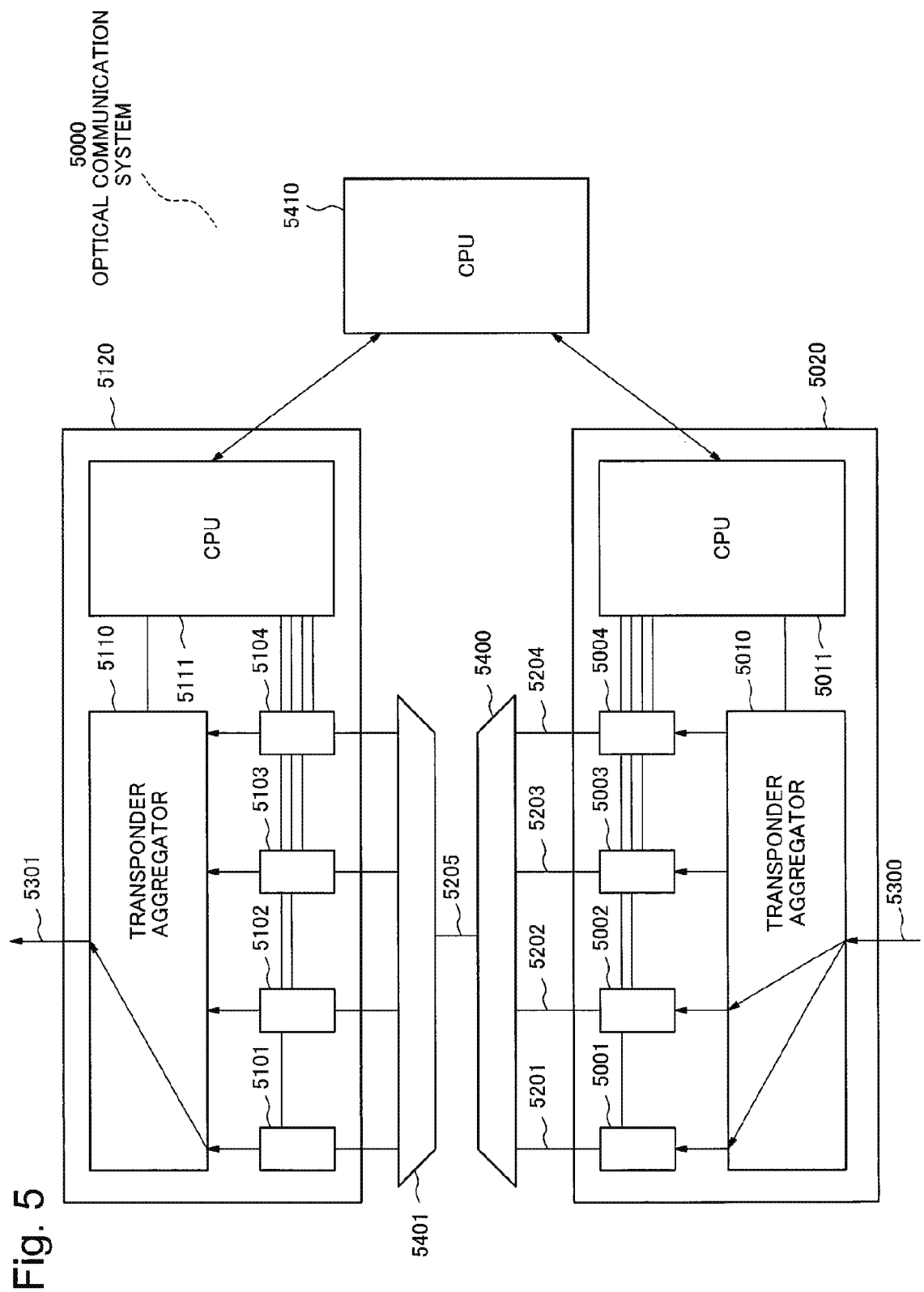
FIG. 5 is a diagram illustrating an example of the configuration of the multi-failure resolution optical node according to the first embodiment of the present invention.

FIG. 5 illustrates an optical communication system 5000 that is an example of the configuration in FIG. 1. Here, an example is described in which optical signal transmission is performed by using an OC-192 signal of SONET standard as a transmission signal, a 10G transponder as an optical transceiver, a 1×4 transponder aggregator as an optical switch, a central processing unit (hereinafter, referred to as a CPU) as a node controller and a network controller, and a bit error rate (BER) as an optical signal reception quality, and using a wavelength multiplexing technology in which a wavelength multiplexer 5400 and a wavelength branching filter 5401 are used instead of an operating system wavelength path, and a first to third standby system wavelength paths. Here, when the power consumption of the normal power consumption mode in the 10G transponder is set as "P1", and the power consumption of the reduced power consumption mode in the 10G transponder is set as "P2", a relationship of "P1>P2" is satisfied. The others are similar to those of FIG. 1.

An operation of the above-configured optical node is described below in detail with reference to FIG. 5. The operation that is overlapped with that of FIG. 1 is omitted herein. The basic operation is similar to that of FIG. 1.

10G transponders 5001 to 5004 output OC-192 signals, but the output wavelengths are different, and the 10G transponders 5001 to 5004 are respectively controlled to output signals having wavelengths 1 to 4 by a CPU 5011. Wavelength multiplexing is performed on the OC-192 signals having the wavelength 1 to wavelength 4, which are respectively output from the 10G transponders 5001 to 5004, in the wavelength multiplexer 5400, and the OC-192 signal on which the wavelength multiplexing has been performed is transmitted to the optical fiber 5205. After the OC-192 signal has been transmitted to the optical fiber 5205 is branched into the signals having the wavelengths 1 to 4 in the wavelength branching filter 5401, and the branched wavelengths 1 to 4 are respectively controlled to be allowed to be input to the 10G transponders 5101 to 5104.

Each of the 10G transponders 5101 to 5104 includes a function that receives an optical signal, performs OC-192 signal frame detection, extracts B1 and B2 bytes from the overhead, and measure the BER. The measured BER is output to a CPU 5111. To the CPU 5111, as a failure detection criterion, a BER threshold value is set beforehand. When the BERs that are output from the 10G transponders 5101 to 5104 exceeds the BER threshold value, it is determined that failures occur in the respective operating system wavelength path having the wavelength 1 and first standby system wavelength path having the wavelength 2, second standby system wavelength path having the wavelength 3, and third standby system wavelength path having the wavelength 4.

When a failure is detected in the operating system wavelength path, immediate wavelength path switching to the first standby system wavelength path for which the 10G transponders 5002 and 5102 are used that are operated in the normal power consumption mode can be performed. When a failure occurs in the first standby system wavelength path, wavelength path switching is performed after the electric power consumption mode switching of the 10G transponder of the second standby system wavelength path has been performed, so that a long time is taken as compared with the switching time from the operating system wavelength path to the first standby system wavelength path, but the failure recovery can be performed. When failures further occur in the second standby system wavelength path and the third standby system wavelength path, the failure recovery cannot be performed anymore. However, due to the addition of the standby system wavelength path, further multi-failure can be recovered.

The power consumption of all of the optical transceivers in the two nodes when all of the optical transceivers are operated in the normal power consumption mode is "8×P1" regardless of presence or absence of an occurrence of a failure. However, in the example, as described above in detail, when a failure does not occur, the power consumption becomes "4×P1+4×P2". Thus, a difference between the power consumption in the example and the power consumption in the case in which all of the optical transceivers are operated in the normal power consumption mode can be represented as "F=½×(1−P2/P1)", and "P1>P2" is satisfied, so that it is found that 50% or more of the electric power reduction effect is obtained.

In the above description, the electric power consumption mode of an optical transceiver that is connected to a wavelength path in which a failure has occurred remains to be the normal power consumption mode by considering that that recovery from the failure is detected, but even when the normal power consumption mode is switched to the reduced power consumption mode, there is no impact on communication service, so that a power consumption difference evaluation value F can be further reduced.

Similar to a conventional technology, for a single failure, a failure recovery architecture of 1+1 is employed, and the same reliability is obtained. For multi-failure such as double failure or more, a long time is taken for switching of the electric power consumption mode of an optical transceiver, so that the failure recovery time is taken long, but the occurrence probability is reduced as the failure multiplicity is increased, so that a cost reduction effect is large that is obtained by suppressing an amount of electric power that is consumed for preparation of a failure that hardly occurs.

In FIG. 5, references 5201 to 5204, 5300, 5301 represent optical fibers, reference 5110 represent a 1×4 transponder aggregator, references 5020, 5120 represent optical nodes, and reference 5410 represents a CPU.

Second Embodiment

Figure 2:
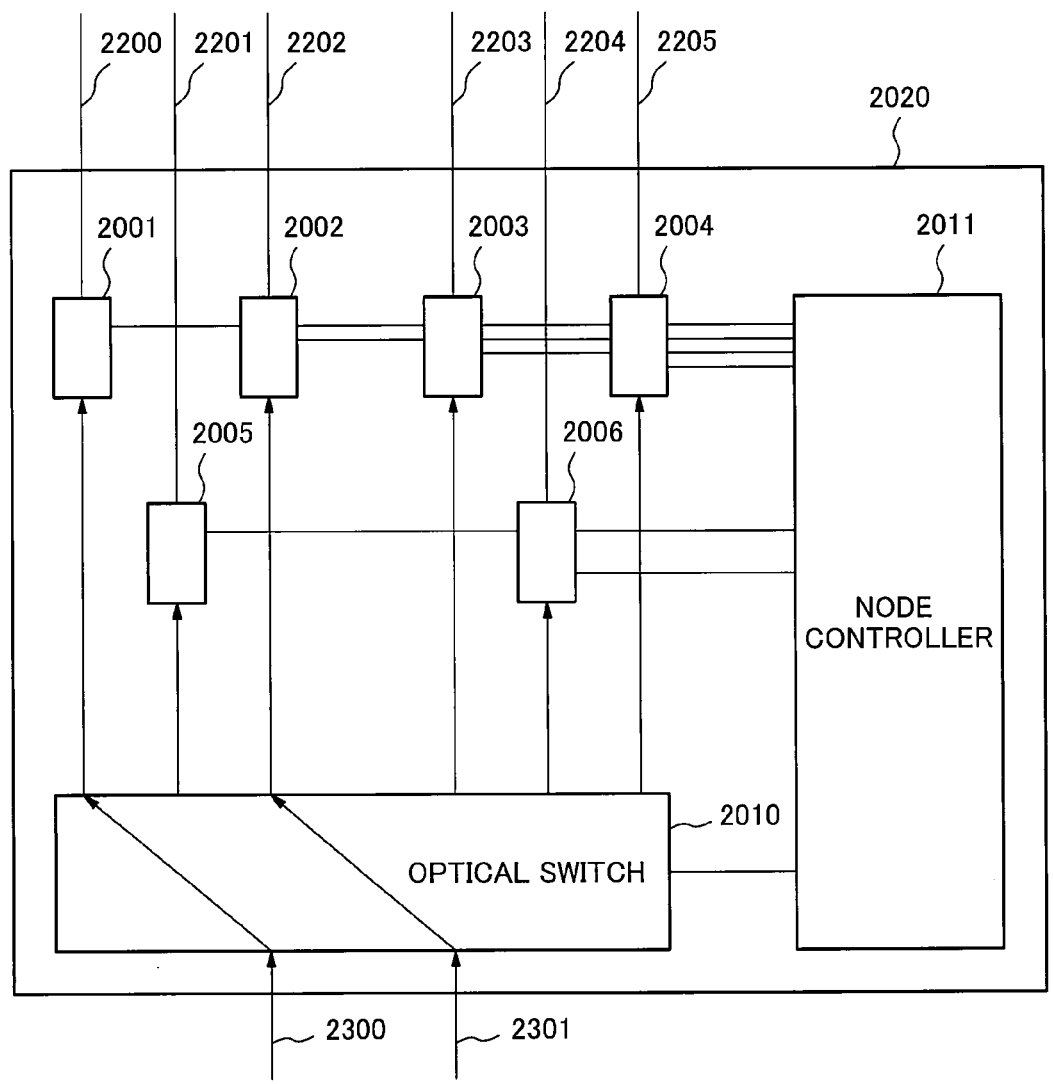
FIG. 2 is a diagram illustrating a configuration of a multi-failure resolution optical node according to a second embodiment of the present invention.

FIG. 2 illustrates a configuration in which an optical transceiver for a standby system wavelength path is shared between two standby system wavelength paths in a multi-failure resolution optical node and a control method of electric power according to a second embodiment of the present invention. FIG. 2 merely illustrates an optical node 2020 on a transmission side, but an optical node on a reception side also has a similar configuration.

To the transmission side optical node 2020, different optical signals are respectively input from optical fibers 2300 and 2301. By a node controller 2011, the input optical signal of the optical fiber 2300 is transmitted to an optical transceiver 2001 through an optical switch 2010, and the input signal of the optical fiber 2301 is transmitted to an optical transceiver 2002 through the optical switch 2010. An optical fiber 2200 to which the optical transceiver 2001 is connected is set as an operating system wavelength path 1 for the optical signal that has been input from the optical fiber 2300. Similarly, an optical fiber 2202 that is connected to the optical transceiver 2002 is set as an operating system wavelength path 2 for the optical signal that has been input from the optical fiber 2301.

At that time, it is assumed that, by not assigning different first standby system wavelength paths for the operating system wavelength path 1 and the operating system wavelength path 2, respectively, but assigning an optical fiber 2201 that is connected to an optical transceiver 2005 as a first standby system wavelength path for both of the operating system wavelength path 1 and the operating system wavelength path 2, the first standby system wavelength path is shared between the operating system wavelength path 1 and the operating system wavelength path 2. As a result, it is sufficient to only use half of the number of required optical transceivers and half of the required power consumption, so that a high power consumption reduction effect can be obtained.

In FIG. 2, references 2203 to 2205 represent optical fibers and references 2003 to 2006 represent optical transceivers.

Third Embodiment

Figure 3:
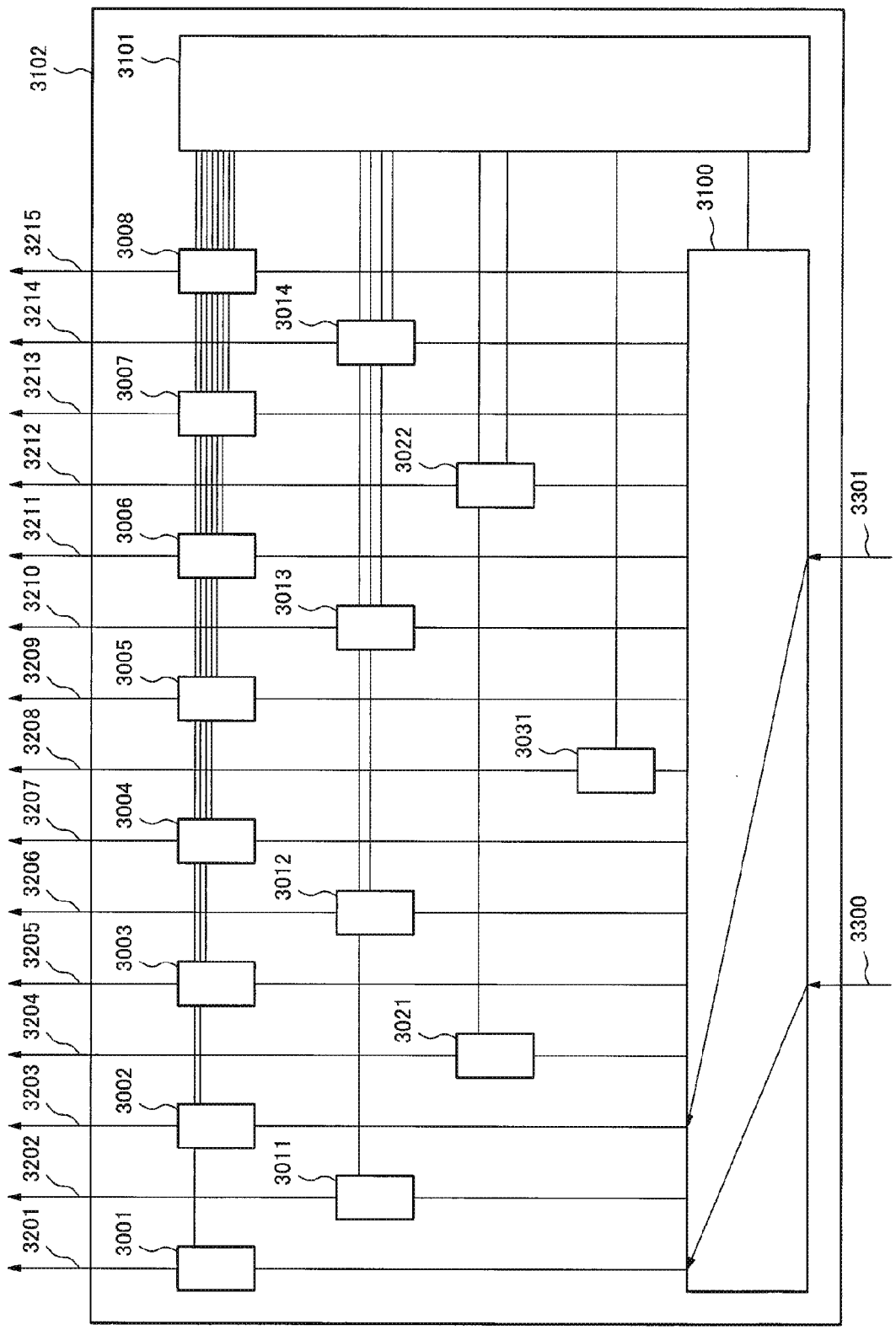
FIG. 3 is a diagram illustrating a configuration of a multi-failure resolution optical node according to a third embodiment of the present invention.

FIG. 3 is related to a third embodiment of the present invention, and illustrates a case in which the sharing of the standby system wavelength path illustrated in FIG. 2 is applied to the second and third standby system wavelength paths in addition to the first standby system wavelength path. FIG. 3 merely illustrates an optical node 3102 on a transmission side, but an optical node on a reception side has a similar configuration.

To the transmission side optical node 3102, different optical signals are respectively input from optical fibers 3300 and 3301. By a node controller 3101, the input optical signal of the optical fiber 3300 is transmitted to an optical transceiver 3001 through an optical switch 3100, and the input signal of the optical fiber 3301 is transmitted to an optical transceiver 3002 through the optical switch 3100. An optical fiber 3201 to which the optical transceiver 3001 is connected is set as an operating system wavelength path 1 for the optical signal that has been input from the optical fiber 3300. Similarly, an optical fiber 3203 that is connected to the optical transceiver 3002 is set as an operating system wavelength path 2 for the optical that has been input from the optical fiber 3301.

At that time, it is assumed that, by not assigning different first standby system wavelength paths for the operating system wavelength path 1 and the operating system wavelength path 2, respectively, but assigning an optical fiber 3202 that is connected to an optical transceiver 3011 as a first standby system wavelength path for both of the operating system wavelength path 1 and the operating system wavelength path 2, the first standby system wavelength path is shared between the operating system wavelength path 1 and the operating system wavelength path 2.

Similarly, an optical fiber 3206 that is connected to an optical transceiver 3012 is set as a first standby system wavelength path 2 for an operating system wavelength path 3 and an operating system wavelength path 4. Here, an optical fiber 3204 that is connected to an optical transceiver 3021 is set as a second standby system wavelength path for the first standby system wavelength path 1 and the first standby system wavelength path 2. Similarly, second and third standby system wavelength paths and the like are shared.

Here, the operating system wavelength paths and the first standby system wavelength paths are operated in the normal power consumption mode. On the other hand, the second and third standby system wavelength paths and the like are operated in the reduced power consumption mode.

In the above-described third embodiment, the power consumption of the entire optical node can be reduced while the reliability of the network is secured. This is why the electric power that is unnecessarily consumed in the standby system wavelength path is selectively reduced. In addition, a single standby system wavelength path is shared between two or more operating system wavelength paths, so that the number of required optical transceivers can be reduced. In addition, the embodiment is scalable. This is why the number of standby system wavelength paths can be increased or decreased flexibly depending on an increase or decrease in the number of operating system wavelength paths and the failure recovery multiplicity.

In FIG. 3, references 3205 to 3215 represent optical fibers, references 3003 to 3008, 3013, 3014, 3022, and 3031 represent optical transceivers.

Fourth Embodiment

Figure 4:
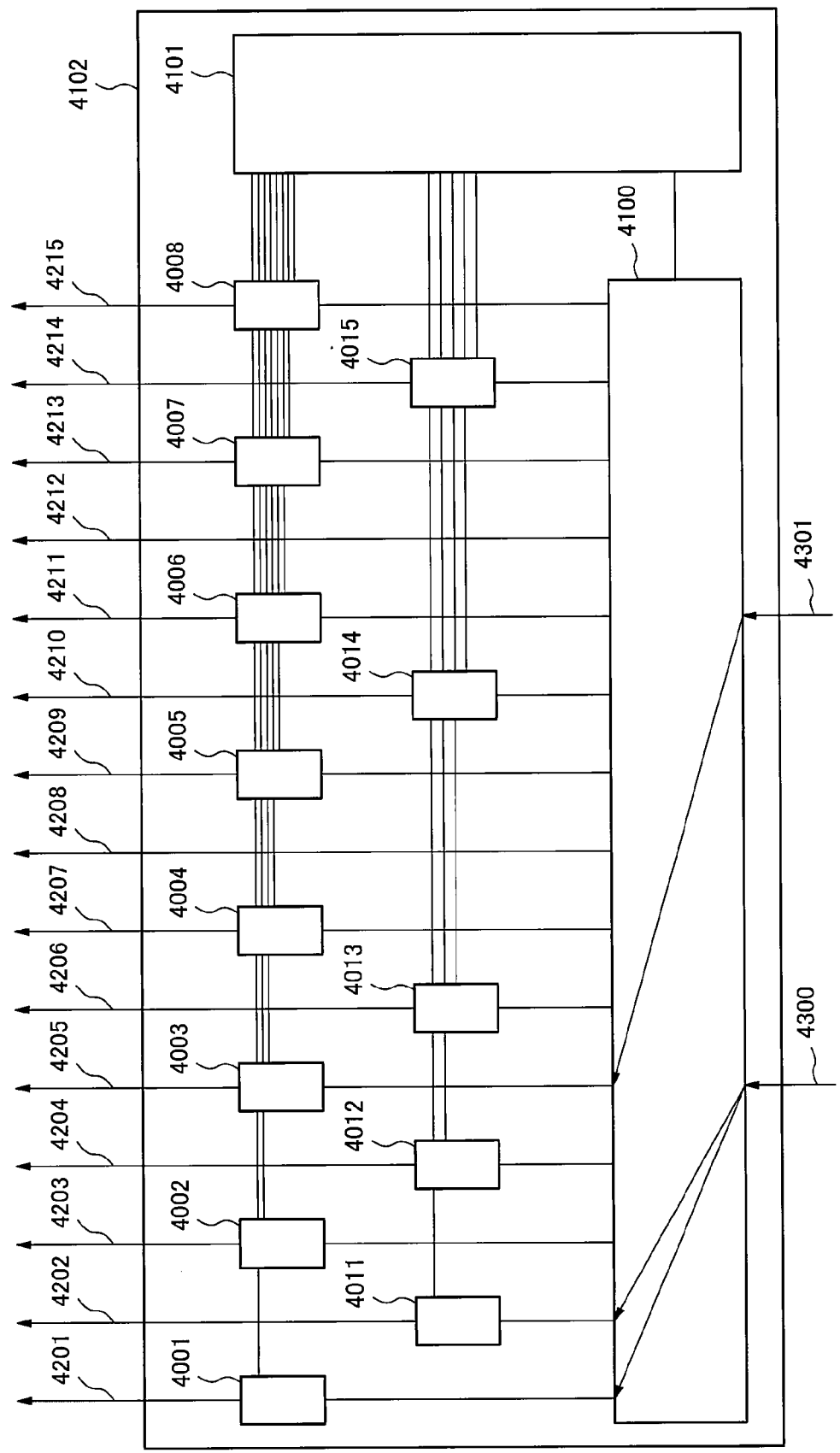
FIG. 4 is a diagram illustrating a configuration of a multi-failure resolution optical node according to a fourth embodiment of the present invention.

FIG. 4 is related to a fourth embodiment of the present invention, and illustrates a case in which immediate failure recovery is performed on a high priority operating system wavelength path, and failure recovery is performed on a low priority operating system wavelength path with a reduced power consumption mode by setting priority levels to the operating system wavelength paths. FIG. 4 merely illustrates an optical node 4102 on a transmission side, but an optical node on a reception side has a similar configuration.

From among optical signal inputs from optical fibers 4300 and 4301, a high priority is set to the input from the optical fiber 4300, and a low priority is set to the input from the optical fiber 4301. Such setting of priority levels can be performed through setting to a node controller 4101 by an operator of an optical node 4102.

The input from the optical fiber 4300 is branched through an optical switch 4100 and guided to optical transceivers 4001 and 4011 that are operated in the normal power consumption mode. An optical fiber 4201 to which the optical transceiver 4001 is connected is set at an operating system wavelength path 1, and an optical fiber 4202 to which the optical transceiver 4011 is connected is set as a first standby system wavelength path 1. The optical transceivers that are used for the operating system wavelength path and the first standby system wavelength path are operated in the normal power consumption mode, so that the failure recovery can be performed by the 1+1 scheme to achieve the immediate failure recovery.

On the other hand, the optical signal input from the optical fiber 4301 to which the low priority is set is guided to an optical transceiver 4003 that is operated in the normal power consumption mode, and is output from an optical fiber 4205 that is an operating system wavelength path 2. Here, an optical fiber 4206 that is connected to an optical transceiver 4013 that is operated in the reduced power consumption mode is set as a first standby system wavelength path 2 that corresponds to the operating system wavelength path 2, and the first standby system wavelength path 2 is shared as a first standby system wavelength path of an optical fiber 4207 that is connected to an optical transceiver 4004 that is operated in the normal power consumption mode.

Thus, for the high priority operating system wavelength path, the power consumption is not reduced, but the immediate failure recovery can be performed, and for the low priority operating system wavelength path, the power consumption is reduced, but the failure recovery time is performed at low speed. That is, by setting priority levels such as the high priority and the low priority, or setting classification such priority and non-priority, immediate failure recovery is selectively performed on the prioritized important operating system wavelength path while the power consumption is reduced as compared with a case in which immediate failure recovery is uniformly performed on all of the operating system wavelength paths.

When a priority level is set to an operating system wavelength path, it is eventually necessary that the operating system wavelength path is classified into a case in which the operating system wavelength path is treated as priority, and the first standby system wavelength path is operated in the normal power consumption mode, or a case in which the operating system wavelength path is treated as non-priority, and the first standby system wavelength path is operated in the reduced power consumption mode. In that case, whether or not each of the operating system wavelength paths is treated as priority can be performed by a method in which the operator of the optical node 4102 sets priority order of each of the operating system wavelength paths to the node controller 4101 beforehand, and the operating system wavelength path is treated as priority in order from an operating system wavelength path having high priority order so that the power consumption does not exceed a maximum allowable power consumption amount in the optical node 4102, which has been set to the node controller 4101 beforehand, or a method in which operating system wavelength paths are treated as priority in accordance with priority order so that the number of operating system wavelength paths does not exceed the number of operating system wavelength paths to be treated as priority, which are defined to the node controller 4101 beforehand. Alternatively, a method can be employed in which the operator of the optical node 4102 forcibly set specification of priority or non-priority to each of the operating system wavelength paths, to the node controller 4101 beforehand.

In the above-described fourth embodiment, the power consumption of the entire optical node can be reduced while the reliability of the network is secured. This is why electric power that is unnecessarily consumed in the standby system wavelength path is selectively reduced. In addition, a priority level is set to the operating system wavelength path, and the electric power control of the optical transceiver depending on the priority level is performed, so that the power consumption can be reduced depending on the degree of importance of service. In addition, the embodiment is scalable. This is why the number of standby system wavelength paths can be increased or decreased flexibly depending on an increase or decrease in the number of operating system wavelength paths and the failure recovery multiplicity.

The present invention is not limited to the above-described embodiments and examples, and various modification can be made within the scope of the invention as set forth in the appended claims, and are also intended to be included within the scope of the present invention, of course.

In addition, all or a part of the above-described embodiments can be also described as the following Supplementary Notes, but not limited to the Supplementary Notes.

In FIG. 4, references 4203, 4204, 4208 to 4215 represent optical fibers, references 4002, 4005 to 4008, 4012, 4014, 4015 represent optical transceivers.

(Supplementary Note 1)

A multi-failure resolution optical node comprising:

an operating system wavelength path;

two or more ranked standby system wavelength paths that are assigned to the operating system wavelength path; and node control means configured to separately operate the operating system wavelength path and the standby system wavelength paths in a normal power consumption mode or a reduced power consumption mode.

(Supplementary Note 2)

The multi-failure resolution optical node according to Supplementary Note 1, wherein the node control means operates the operating system wavelength path and a standby system wavelength path having first order in the normal power consumption mode, and operates a standby system wavelength path having second order or less in the reduced power consumption mode.

(Supplementary Note 3)

The multi-failure resolution optical node according to Supplementary Note 2, wherein the node control means checks presence or absence of a failure in the operating system wavelength path, checks presence or absence of a failure in the standby system wavelength path having the first order when the node control means determines the presence of the failure in the operating system wavelength path, switches the standby system wavelength path having the first order to the operating system wavelength path when the node control means determines the absence of the failure in the standby system wavelength path having the first order, checks presence or absence of a failure in the standby system wavelength path having the second order or less by switching the reduced power consumption mode to the normal power consumption mode in order from a top of the ranking when the node control means determines the presence of the failure in the standby system wavelength path having the first order, and switches the standby system wavelength path having the second order or less the absence of the failure of which is determined first, to the operating system wavelength path.

(Supplementary Note 4)

The multi-failure resolution optical node according to Supplementary Note 1, wherein the node control means specifies priority or non-priority of the operating system wavelength path, and in a case in which the node control means specifies the priority, the node control means operates the operating system wavelength path and a standby system wavelength path having first order in a normal power consumption mode, operates a standby system wavelength path having second order or less in the reduced power consumption mode, checks presence or absence of a failure in the operating system wavelength path, checks presence or absence of a failure in the standby system wavelength path having the first order when the node control means determines the presence of the failure in the operating system wavelength path, switches the standby system wavelength path having the first order to the operating system wavelength path when the node control means determines the absence of the failure in the standby system wavelength path having the first order, checks presence or absence of a failure in the standby system wavelength path having the second order or less by switching the reduced power consumption mode to the normal power consumption mode in order from a top of the ranking when the node control means determines the presence of the failure in the standby system wavelength path having the first order, and switches the standby system wavelength path having the second order or less the absence of the failure of which is determined first, to the operating system wavelength path, and in a case in which the node control means specifies the non-priority, the node control means operates the operating system wavelength path in the normal power consumption mode, operates the standby system wavelength path in the reduced power consumption mode, checks presence or absence of a failure in the operating system wavelength path, checks presence or absence of a failure in the standby system wavelength paths by switching the reduced power consumption mode to the normal power consumption mode in order from the top of the ranking when the node control means determines the presence of the failure in the operating system wavelength path, and switches the standby system wavelength path the absence of the failure of which is determined first, to the operating system wavelength path.

(Supplementary Note 5)

The multi-failure resolution optical node according to Supplementary Note 4, wherein in the specification of priority or non-priority to the operating system wavelength path, the node control means specifies the operating system wavelength path as priority so that the power consumption does not exceed a maximum allowable power consumption amount that is set to the node control means beforehand, in accordance with priority order of the operating system wavelength paths, which is set to the node control means beforehand, from the priority order, and the maximum allowable power consumption amount.

(Supplementary Note 6)

The multi-failure resolution optical node according to Supplementary Note 4, wherein in the specification of priority or non-priority to the operating system wavelength path, the node control means specifies the operating system wavelength path as priority so that the number of operating system wavelength paths does not exceed the number of operating system wavelength paths to be treated as priority, which is set to the node control means beforehand, in accordance with priority order of the operating system wavelength paths, which is set to the node control means beforehand, from the priority order, and the number of operating system wavelength paths to be treated as priority.

(Supplementary Note 7)

The multi-failure resolution optical node according to one of Supplementary Notes 1 to 6, wherein there is provided a plurality of operating system wavelength paths, and the plurality of operating system wavelength paths share the standby system wavelength path.

(Supplementary Note 8)

the multi-failure resolution optical node according to one of Supplementary Notes 1 to 7, wherein the operating system wavelength path and the standby system wavelength path include optical switch means and optical transceiver means.

(Supplementary Note 9)

An optical communication system comprising:

the multi-failure resolution optical node that is provided on a transmission side;

the multi-failure resolution optical node that is provided on a reception side;

network control means configured to share information between the node control means of the multi-failure resolution optical node on the transmission side, and the node control means of the multi-failure resolution optical node on the reception side.

(Supplementary Note 10)

The optical communication system according to Supplementary Note 9, wherein the shared information includes configurations of the operating system wavelength path and the standby system wavelength path.

(Supplementary Note 11)

the optical communication system according to Supplementary Note 7, wherein the shared information includes setting of the normal power consumption mode or the reduced power consumption mode.

(Supplementary Note 12)

the optical communication system according to Supplementary Note 9, wherein the shared information includes an occurrence status of a failure in the operating system wavelength path and the standby system wavelength path.

(Supplementary Note 13)

A wavelength path switching method in which an operating system wavelength path is operated in a normal power consumption mode, and a standby system wavelength path having first order is operated in the normal power consumption mode, and a standby system wavelength path having second order or less is operated in a reduced power consumption mode, from among two or more ranked standby system wavelength paths that are assigned to the operating system wavelength path, and the standby system wavelength path is switched to the operating system wavelength path, the wavelength path switching method comprising:

a first checking step of checking presence or absence of a failure in the operating system wavelength path;

a second checking step of checking of presence or absence of a failure in the standby system wavelength path having the first order when the presence of the failure in the operating system wavelength path is determined in the first checking step;

a first switching step of switching the standby system wavelength path having the first order to the operating system wavelength path when the absence of the failure in the standby system wavelength path having the first order is determined in the second checking step;

a third checking step of checking presence or absence of a failure in the standby system wavelength path having the second order or less by switching the mode of the standby system wavelength path having the second order or less to the normal power consumption mode in order from a top of the ranking when the presence of the failure in the standby system wavelength path having the first order is determined in the second checking step; and a second switching step of switching the standby system wavelength path having the second order or less the absence of the failure of which is determined first in the third checking step, to the operating system wavelength path.

(Supplementary Note 14)

A wavelength path switching method in which an operating system wavelength path is operated in a normal power consumption mode, and specification of priority or non-priority is performed on the operating system wavelength path, and when the priority is specified to one or more ranked standby system wavelength paths that are assigned to the operating system wavelength path, a standby system wavelength path having first order is operated in the normal power consumption mode, and a standby system wavelength path having second order or less is operated in a reduced power consumption mode, and when the non-priority is specified to the one or more ranked standby system wavelength paths, the standby system wavelength path is operated in the reduced power consumption mode, and the standby system wavelength path is switched to the operating system wavelength path, the wavelength path switching method comprising:

a first checking step of checking presence or absence of a failure in the operating system wavelength path;

a second checking step of checking presence or absence of a failure in the standby system wavelength path having the first order when the presence of the failure in the operating system wavelength path is determined in the first checking step in a case in which the priority is specified;

a first switching step of switching the standby system wavelength path having the first order to the operating system wavelength path when the absence of the failure in the standby system wavelength path having the first order is determined in the second checking step;

a third checking step of checking presence or absence of a failure in the standby system wavelength path having the second order or less by switching the mode of the standby system wavelength path having the second order or less to the normal power consumption mode in order from a top of ranking when the presence of the failure is determined in the second checking step;

a second switching step of switching the standby system wavelength path having the second order or less the absence of the failure of which is determined first in the third checking step, to the operating system wavelength path;

a fourth checking step of checking presence or absence of a failure in the standby system wavelength path by performing switching of the mode of the standby system wavelength path to the normal power consumption mode in order from the top of the ranking, in a case in which the non-priority is specified; and a third switching step of switching the standby system wavelength path the absence of the failure of which is determined first in the fourth checking step, to the operating system wavelength path.

This application claims priority based on Japanese Patent Application No. 2012-172516, filed on Aug. 3, 2012, the entire disclosure of which is incorporated herein.

INDUSTRIAL APPLICABILITY

The present invention is related to an optical node that includes a multi-failure recovery function, and in particular, to an optical node that includes a multi-failure recovery function that reduces the power consumption, and an optical communication system using the optical node, and a wavelength path switching method.

REFERENCE SIGNS LIST 1000 optical communication system
1001 to 1004, and 1101 to 1104 optical transceiver
1201 to 1204, 1300, and 1301 optical fiber
1010 and 1110 optical switch
1011 and 1111 node controller
1400 network controller
1020 and 1120 optical node
2001 to 2006 optical transceiver
2200 to 2205, and 2300 optical fiber
2010 optical switch
2011 node controller
2020 optical node
3001 to 3008, and 3011 to 3014 optical transceiver
3021 to 3022, and 3031 optical transceiver
3201 to 3215, and 3300 to 3301 optical fiber
3100 optical switch
3101 node controller
3102 optical node
4001 to 4008, and 4011 to 4015 optical transceiver
4201 to 4215, and 4300 to 4301 optical fiber
4100 optical switch
4101 node controller
4102 optical node
5000 optical communication system
5001 to 5004, and 5101 to 5104 10G transponder
5201 to 5204, 5300, 5301, and 5205 optical fiber
5400 optical multiplexer
5401 optical branching filter
5010 and 5110 1×4 transponder aggregator
5011, 5111, and 5410 CPU
5020 and 5120 optical node

What is claimed is:

1. A multi-failure resolution optical node comprising:
an operating system wavelength path;
two or more ranked standby system wavelength paths that are assigned to the operating system wavelength path; and
a node control unit configured to separately operate the operating system wavelength path and the standby system wavelength paths in a normal power consumption mode or a reduced power consumption mode, wherein
the node control unit operates the operating system wavelength path and a standby system wavelength path having first order in the normal power consumption mode, and operates a standby system wavelength path having second order or less in the reduced power consumption mode, and
the node control unit checks presence or absence of a failure in the operating system wavelength path, checks presence or absence of a failure in the standby system wavelength path having first order when the node control unit determines the presence of the failure in the operating system wavelength path, switches the standby system wavelength path having the first order to the operating system wavelength path when the node control unit determines the absence of the failure in the standby system wavelength path having the first order, checks presence or absence of a failure in the standby system wavelength path having the second order or less by switching the reduced power consumption mode to the normal power consumption mode in order from a top of the ranking when the node control unit determines the presence of failure in the standby system wavelength path having the first order, and switches the standby system wavelength path having the second order or less the absence of the failure of which is determined first, to the operating system wavelength path.

2. The multi-failure resolution optical node according to claim 1, wherein
there is provided a plurality of operating system wavelength paths, and the plurality of operating system wavelength paths share the standby system wavelength path.

3. The multi-failure resolution optical node according to claim 1, wherein
the operating system wavelength path and the standby system wavelength path include optical switch unit and optical transceiver unit.

4. An optical communication system comprising:
the multi-failure resolution optical node according to claim 1 that is provided on a transmission side and a reception side; and
a network control unit configured to share information between the node control unit of the multi-failure resolution optical node on the transmission side, and the node control unit of the multi-failure resolution optical node on the reception side.

5. The optical communication system according to claim 4, wherein
the shared information includes at least one of configurations of the operating system wavelength path and the standby system wavelength path, setting of the normal power consumption mode or the reduced power consumption mode, and an occurrence status of a failure in the operating system wavelength path and the standby system wavelength path.

6. A multi-failure resolution optical node comprising:
an operating system wavelength path;
two or more ranked standby system wavelength paths that are assigned to the operating system wavelength path; and
a node control unit configured to separately operate the operating system wavelength path and the standby system wavelength paths in a normal power consumption mode or a reduced power consumption mode, wherein
the node control unit specifies priority or non-priority of the operating system wavelength path, and in a case in which the node control unit specifies the priority, the node control unit operates the operating system wavelength path and a standby system wavelength path having first order in a normal power consumption mode, operates a standby system wavelength path having second order or less in the reduced power consumption mode, checks presence or absence of a failure in the operating system wavelength path, checks presence or absence of a failure in the standby system wavelength path having the first order when the node control unit determines the presence of the failure in the operating system wavelength path, switches the standby system wavelength path having the first order to the operating system wavelength path when the node control unit determines the absence of the failure in the standby system wavelength path having the first order, checks presence or absence of a failure in the standby system wavelength path having the second order or less by switching the reduced power consumption mode to the normal power consumption mode in order from a top of the ranking when the node control unit determines the presence of the failure in the standby system wavelength path having the first order, and switches the standby system wavelength path having the second order or less the absence of the failure of which is determined first, to the operating system wavelength path, and in a case in which the node control unit specifies the non-priority, the node control unit operates the operating system wavelength path in the normal power consumption mode, operates the standby system wavelength path in the reduced power consumption mode, checks presence or absence of a failure in the operating system wavelength path, checks presence or absence of a failure in the standby system wavelength paths by switching the reduced power consumption mode to the normal power consumption mode in order from the top of the ranking when the node control unit determines the presence of the failure in the operating system wavelength path, and switches the standby system wavelength path the absence of the failure of which is determined first, to the operating system wavelength path.

7. The multi-failure resolution optical node according to claim 6, wherein
there is provided a plurality of operating system wavelength paths, and the plurality of operating system wavelength paths share the standby system wavelength path.

8. The multi-failure resolution optical node according to claim 6, wherein
the operating system wavelength path and the standby system wavelength path include optical switch unit and optical transceiver unit.

9. An optical communication system comprising:
the multi-failure resolution optical node according to claim 6 that is provided on a transmission side and a reception side;
network control unit configured to share information between the node control unit of the multi-failure resolution optical node on the transmission side, and the node control unit of the multi-failure resolution optical node on the reception side.

10. The optical communication system according to claim 9, wherein
the shared information includes at least one of configurations of the operating system wavelength path and the standby system wavelength path, setting of the normal power consumption mode or the reduced power consumption mode, and an occurrence status of a failure in the operating system wavelength path and the standby system wavelength path.

11. A wavelength path switching method in which an operating system wavelength path is operated in a normal power consumption mode, and a standby system wavelength path having first order is operated in the normal power consumption mode, and a standby system wavelength path having second order or less is operated in a reduced power consumption mode, from among two or more ranked standby system wavelength paths that are assigned to the operating system wavelength path, and the standby system wavelength path is switched to the operating system wavelength path, the wavelength path switching method comprising:
- a first checking presence or absence of a failure in the operating system wavelength path;
- a second checking presence or absence of a failure in the standby system wavelength path having the first order when the presence of the failure in the operating system wavelength path is determined in the first checking;
- a first switching the standby system wavelength path having the first order to the operating system wavelength path when the absence of the failure in the standby system wavelength path having the first order is determined in the second checking;
- a third checking presence or absence of a failure in the standby system wavelength path having the second order or less by switching the mode of the standby system wavelength path having the second order or less to the normal power consumption mode in order from a top of the ranking when the presence of the failure in the standby system wavelength path having the first order is determined in the second checking; and
- a second switching the standby system wavelength path having the second order or less, the absence of the failure is determined first in the third checking, to the operating system wavelength path.

12. The wavelength path switching method according to claim 11, wherein
an operating system wavelength path is operated in a normal power consumption mode, and specification of priority or non-priority is performed on the operating system wavelength path, and when the priority is specified to one or more ranked standby system wavelength paths that are assigned to the operating system wavelength path, a standby system wavelength path having first order is operated in the normal power consumption mode, and a standby system wavelength path having second order or less is operated in the reduced power consumption mode, and when the non-priority is specified to the one or more ranked standby system wavelength paths that are assigned to the operating system wavelength path, the standby system wavelength path is operated in the reduced power consumption mode, and the standby system wavelength path is switched to the operating system wavelength path, the wavelength path switching method comprising:

the first checking presence or absence of a failure in the operating system wavelength path;
the second checking presence or absence of a failure in the standby system wavelength path having the first order when the presence of the failure in the operating system wavelength path is determined in the first checking in a case in which the priority is specified;
the first switching the standby system wavelength path having the first order to the operating system wavelength path when the absence of the failure in the standby system wavelength path having the first order is determined in the second checking;
the third checking presence or absence of a failure in the standby system wavelength path having the second order or less by switching the mode of the standby system wavelength path having the second order or less to the normal power consumption mode in order from a top of the ranking when the presence of the failure in the standby system wavelength path having the first order is determined in the second checking;
the second switching the standby system wavelength path having the second order or less the absence of the failure of which is determined first in the third checking, to the operating system wavelength path;
a fourth checking presence or absence of a failure in the standby system wavelength path by switching the mode of the standby system wavelength path to the normal power consumption mode in order from the top of the ranking, in a case in which the non-priority is specified; and
a third switching the standby system wavelength path the absence of the failure of which is determined first in the fourth checking, to the operating system wavelength path.

* * * * *